United States Patent
Nishiyama

(10) Patent No.: US 10,764,498 B2
(45) Date of Patent: Sep. 1, 2020

(54) IMAGE PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Tomohiro Nishiyama, Tama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 12 days.

(21) Appl. No.: 15/924,499

(22) Filed: Mar. 19, 2018

(65) Prior Publication Data

US 2018/0278848 A1    Sep. 27, 2018

(30) Foreign Application Priority Data

Mar. 22, 2017 (JP) .................. 2017-056457
Dec. 26, 2017 (JP) .................. 2017-250109

(51) Int. Cl.
*H04N 5/232* (2006.01)
*H04N 5/235* (2006.01)
(Continued)

(52) U.S. Cl.
CPC ..... *H04N 5/23254* (2013.01); *G06K 9/00825* (2013.01); *G06T 5/002* (2013.01);
(Continued)

(58) Field of Classification Search
CPC .......... H04N 5/23254; H04N 5/23256; H04N 5/23261; H04N 5/23264; H04N 5/23216; H04N 5/23229; H04N 5/235; H04N 5/232133; G06T 5/002; G06T 5/40; G06T 5/00; G06T 5/50; G06T 2207/20201; G06K 9/00825
USPC ...... 348/154, 155, 208.1, 208.2, 220.1, 352, 348/36, 169, 208.14, 231.6, 333.05, 348/218.1; 382/103, 294
See application file for complete search history.

(56) References Cited

U.S. PATENT DOCUMENTS 6,392,658 B1 *  5/2002  Oura ................. H04N 5/222
                                                    345/629
8,736,666 B2 *  5/2014  Ishida ............... H04N 7/00
                                                    348/39
(Continued)

FOREIGN PATENT DOCUMENTS

JP         4569389 B2    10/2010

*Primary Examiner* — Marly S Camargo
(74) *Attorney, Agent, or Firm* — Rossi, Kimms & McDowell LLP

(57) ABSTRACT

The invention generates an image having a sense of speed in conformity with each of a plurality of subjects in an image so as to generate an image in which a subject that the user wishes is made stationary. An apparatus comprises an acquiring unit which acquires a plurality of pieces of image data captured consecutively; an identifying unit which identifies a subject in the image data; and a generating unit which generates a first composite image in which at least two pieces of image data, among the plurality of pieces of image data, are composed in accordance with a motion of a first subject, and a second composite image in which at least two pieces of image data are composed in accordance with a motion of a second subject whose motion is different to the motion of the first subject.

19 Claims, 15 Drawing Sheets

(51) Int. Cl.
  *G06T 5/00* (2006.01)
  *G06T 5/40* (2006.01)
  *G06T 5/50* (2006.01)
  *G06K 9/00* (2006.01)

(52) U.S. Cl.
  CPC .............. *G06T 5/40* (2013.01); *G06T 5/50* (2013.01); *H04N 5/23216* (2013.01); *H04N 5/23229* (2013.01); *H04N 5/23261* (2013.01); *H04N 5/23264* (2013.01); *G06T 2207/20201* (2013.01)

(56) References Cited

U.S. PATENT DOCUMENTS

| | | | | |
|---|---|---|---|---|
| 9,253,398 | B2* | 2/2016 | Matsumoto | H04N 5/23222 348/222.1 |
| 2007/0110417 | A1* | 5/2007 | Itokawa | H04N 5/23254 |
| 2009/0234473 | A1* | 9/2009 | Anderson | H04N 7/00 348/39 |
| 2013/0162786 | A1* | 6/2013 | Kosakai | H04N 13/0221 348/50 |
| 2015/0029305 | A1* | 1/2015 | Matsumoto | H04N 5/23238 348/36 |
| 2018/0067296 | A1* | 3/2018 | Sugie | H04N 5/232133 382/128 |
| 2018/0084119 | A1* | 3/2018 | Yoshida | G11B 27/327 358/1.5 |
| 2018/0103208 | A1* | 4/2018 | Jung | H04N 5/23287 348/169 |
| 2020/0118247 | A1* | 4/2020 | Yonaha | G06T 3/4038 382/284 |

* cited by examiner

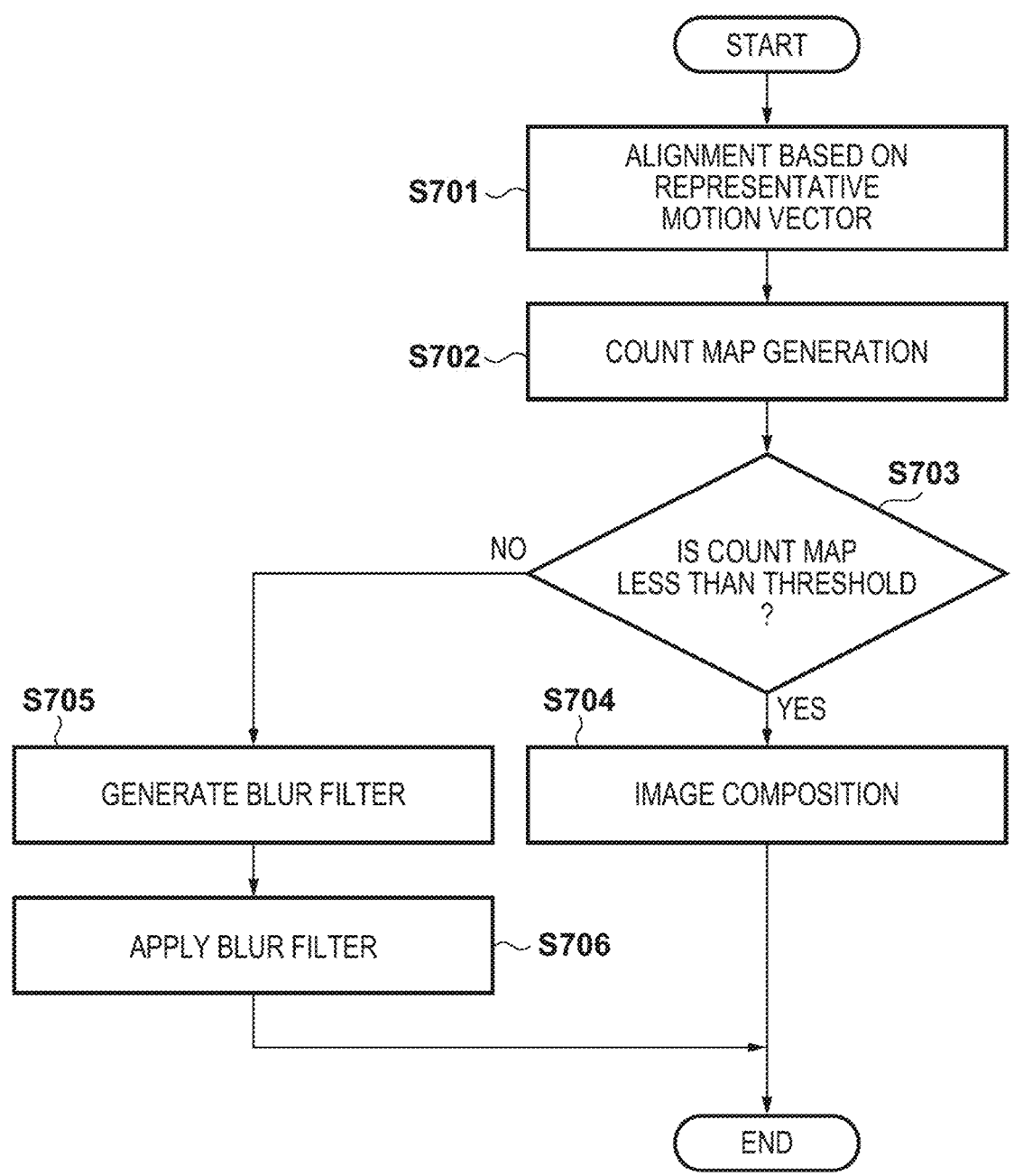

IMAGE PROCESSING APPARATUS, METHOD OF CONTROLLING THE SAME, AND STORAGE MEDIUM

BACKGROUND OF THE INVENTION

Field of the Invention

The present invention relates to a technique for applying a motion blur to an image.

Description of the Related Art

A "panning shot" is known as a technique for image capturing that emphasizes the motion of a subject. In a panning shot, the shutter speed is set to be slower than usual, and the videographer pans (moves) the camera in conformity with the motion of a subject. In obtained images, the subject is stationary and the background flows. An airplane upon takeoff and landing or during low-altitude flying, a traveling train, automobile, motorbike or the like are representative subjects, and a sense of the speed of a fast moving subject is expressed. Also, other than this, it is possible to obtain a still image having a sense of speed by emphasizing the motion blur of a subject whose movement speed is fast.

Japanese Patent No. 4569389 discloses a technique in which a plurality of images are acquired by continuous capturing, motion vectors are estimated, and by performing composition that aligns a subject whose movement speed is slowest in the images, the user can easily obtain an image that simulates a panning shot.

However, since the subject whose movement speed is smallest is automatically extracted, the method of this reference cannot respond to demand for generation of an image having a sense of speed in which another subject on which the user wishes to focus is caused to be stationary.

SUMMARY OF THE INVENTION

The present invention was conceived in view of these issues, and provides a technique for generating an image having a sense of speed in conformity with each of a plurality of subjects in an image, so as to generate an image in which a subject that the user wishes is made stationary.

According to an aspect of the invention, there is provided an image processing apparatus that generates a composite image from a plurality of images, the apparatus comprising: an acquiring unit configured to acquire a plurality of pieces of image data captured consecutively; an identifying unit configured to identify a subject in the image data; and a generating unit configured to generate a first composite image in which at least two pieces of image data, among the plurality of pieces of image data, are composed in accordance with a motion of a first subject, and a second composite image in which at least two pieces of image data, among the plurality of pieces of image data, are composed in accordance with a motion of a second subject whose motion is different to the motion of the first subject.

According to the present invention, since an image having a sense of speed in conformity with each of a plurality of subjects in the image is generated, it becomes possible to obtain or facilitate obtainment of an image in which a subject that the user wishes is made stationary.

Further features of the present invention will become apparent from the following description of exemplary embodiments (with reference to the attached drawings).

BRIEF DESCRIPTION OF THE DRAWINGS

FIG. 7 is a flowchart illustrating a flow of processing of the blur addition unit.

DESCRIPTION OF THE EMBODIMENTS

Hereinafter, embodiments according to the present invention are described in detail in accordance with the accompanying drawings.

First Embodiment

A case in which a plurality of images, to which a motion blur is applied and for which the subject that is made stationary differs, are displayed on a UI screen is described.

Figure 1:
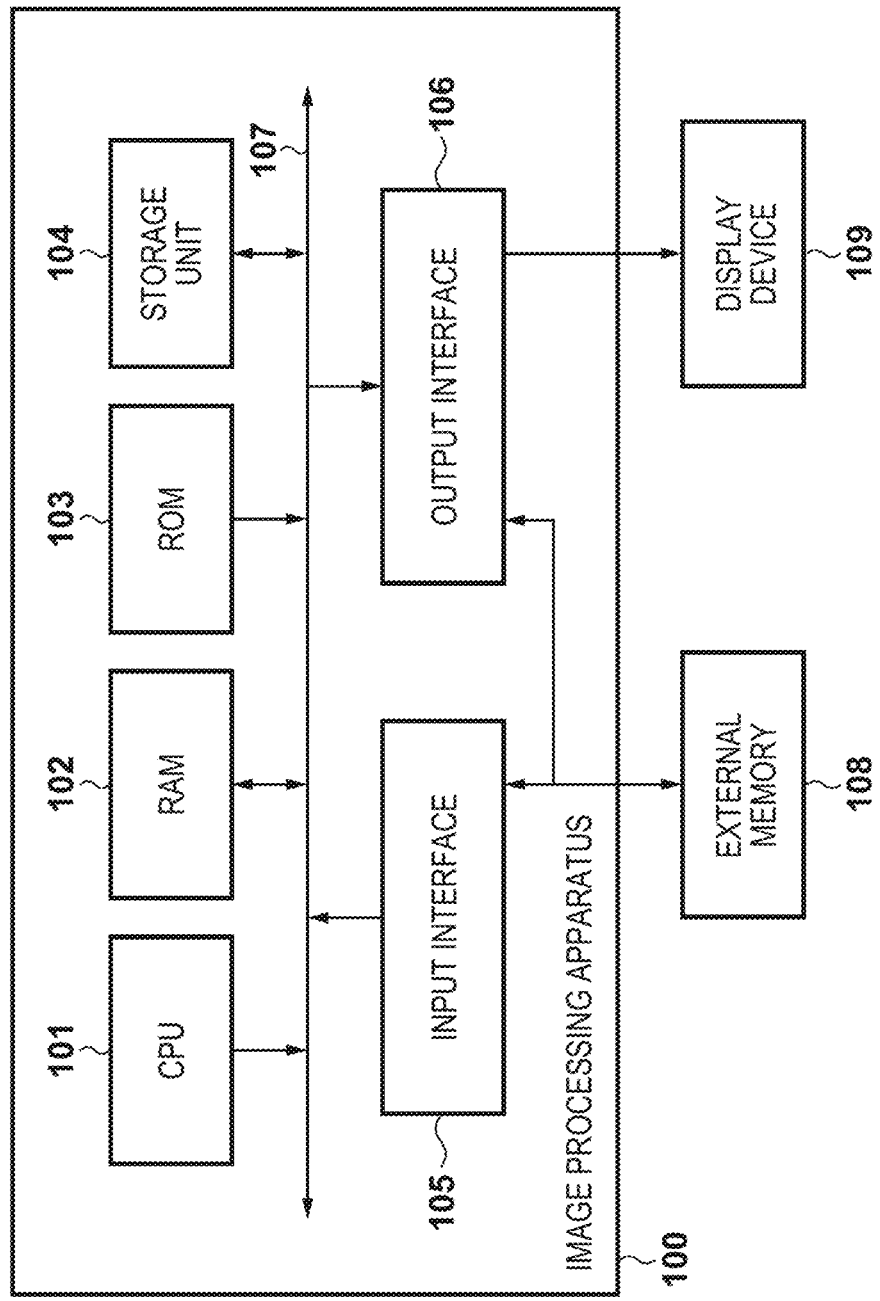
FIG. 1 is a block diagram illustrating a configuration of an image processing apparatus.

FIG. 1 is a view illustrating a configuration of an image processing apparatus 100 of the present embodiment. The image processing apparatus 100 is configured by a CPU 101, a RAM 102, a ROM 103, a storage unit 104, an input interface 105, an output interface 106, and a system bus 107. An external memory 108 is connected to the input interface 105 and the output interface 106, and a display device 109 and the output interface 106 are connected.

The CPU 101 is a processor for comprehensively controlling each configuration of the image processing apparatus 100, and the RAM 102 is a memory that functions as a main memory or a work area of the CPU 101. Also, the ROM 103 is a memory that stores programs used in processing in the image processing apparatus 100. The CPU 101 executes various later-described processes by executing programs stored in the ROM 103, using the RAM 102 as a work area. The storage unit 104 is a storage device for storing image data used in processing in the image processing apparatus 100 and parameters and the like for processing. It is possible to use an HDD, an optical disk drive, a flash memory, or the like as the storage unit 104. The input interface 105 is a serial bus interface such as USB, IEEE 1394, or the like. The image processing apparatus 100 can acquire image data or the like to be processed from the external memory 108 (for example, hard disk, memory card, CF card, SD card, USB memory) via the input interface 105. The output interface 106 is a video output terminal such as DVI, HDMI (registered trademark), or the like. The image processing apparatus 100 can output image data processed in the image processing apparatus 100 to the display device 109 (image display device such as a liquid crystal display) via the output interface 106. Note that while there are configuration elements of the image processing apparatus 100 other than those described above, description thereof is omitted as they are not the main focus of the present invention.

Figure 2:
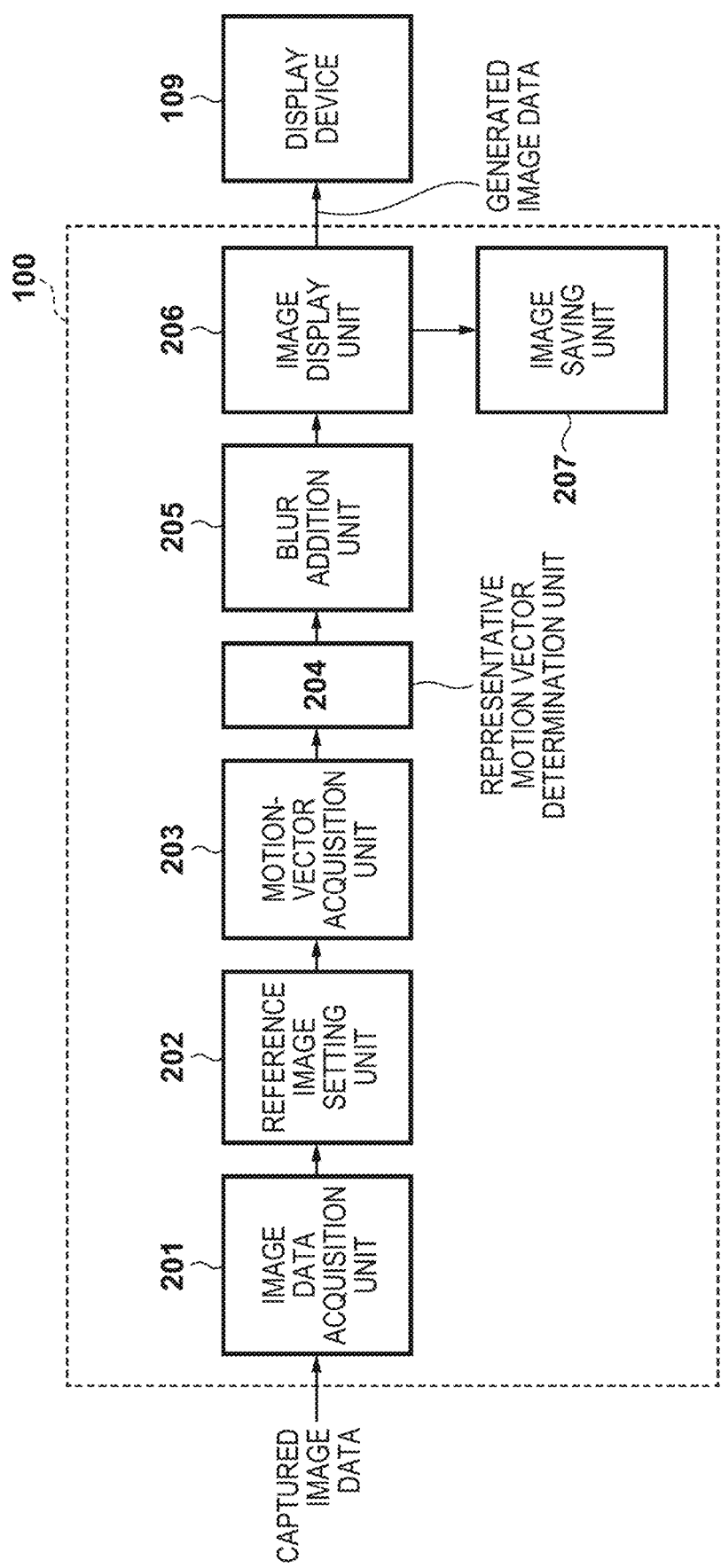
FIG. 2 is a block diagram illustrating a configuration of the image processing apparatus of a first embodiment.
Figure 3:
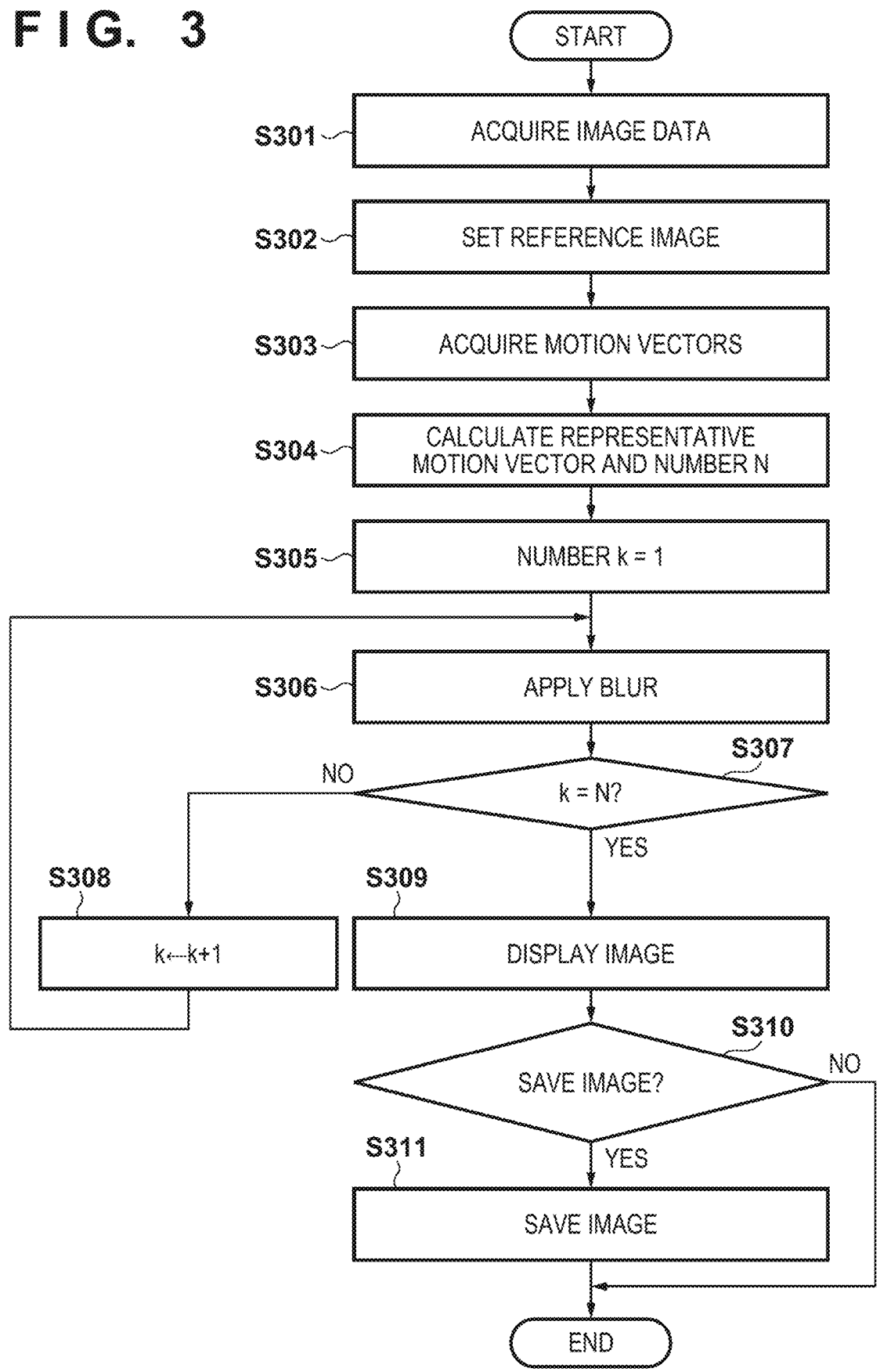
FIG. 3 is a flowchart illustrating a flow of the image processing apparatus of the first embodiment.

Hereinafter, processing in the image processing apparatus 100 of the present embodiment will be described using the block diagram illustrated in FIG. 2 and the flowchart illustrated in FIG. 3. FIG. 2 is a processing block diagram for the image processing apparatus 100. In the present embodiment, the CPU 101 functions as each block described in FIG. 2 by executing the program illustrated in the flowchart of FIG. 3 stored in the ROM 103. Of course, the CPU 101 need not have the functions of all of the processing blocks, and configuration may be taken so as newly provide processing circuitry corresponding to each of the processing blocks in the image processing apparatus 100. Operations of each step are described as things that the CPU 101 executes, but dedicated processing modules may be held, and those modules may perform the processing. Note that in the description below, image data that is to be processed is described as something that is already stored in the storage unit 104.

In step S301, an image data acquisition unit 201 acquires, from the storage unit 104, image data of a plurality of images (two or more) obtained by consecutive image capturing.

In step S302, a reference image setting unit 202, from the acquired plurality of pieces of image data, sets an image (hereinafter, reference image data) that serves as a reference when applying motion blur. The method of determining reference image data does not particularly matter, but in the embodiment, it is assumed to be the first image data obtained by capturing among the plurality of pieces of image data captured in continuous capturing. Of course, image data captured last, or image data of an intermediate frame may be used.

In step S303, a motion-vector acquisition unit 203 acquires motion vectors between a plurality of pieces of image data. Here, motion vector means a vector indicating how much, and in what direction, a respective subject has moved between images. A motion vector may be provided for each pixel, and it is possible to divide into regions and provide a motion vector for each region. In a case where a motion vector is estimated from a plurality of pieces of image data, it is assumed that feature point matching, block matching, gradient method optical flow estimation or the like are employed. A method other than these may be used as the method for estimating motion vectors. For example, in a case where information of a gyro sensor or an acceleration sensor mounted in the camera is associated with image data, those may be taken advantage of. Below, a case in which a motion vector is estimated for each pixel by using a gradient method will be described. Also, data represented by motion vectors for each pixel will be referred to as a motion vector map hereinafter.

In step S304, a representative motion vector determination unit 204 determines motion vectors (hereinafter, representative motion vector) as representatives from out of a motion vector map. Also, the representative motion vector determination unit 204 determines N representative motion vectors. Detailed operation of the representative motion vector determination unit 204 will be described later.

In step S305, a blur addition unit 205 sets an initial value "1" to the variable k which represents a representative motion vector index. Then, in step S306, the blur addition unit 205 generates composite image data to which blurring is applied based on the k-th representative motion vector (the motion vector of interest) and the plurality of pieces of image data. Detailed operation of the blur addition unit 205 will be described later.

In step S307, the blur addition unit 205 determines whether or not the index k of the representative motion vector is equal to the number of representative motion vectors N. In a case where k is smaller than N, the blur addition unit 205 increases the value of the variable k by "1" in step S308, and the processing returns to step S306. In a case where k is equal to N, the blur addition unit 205 has generated blur-applied images corresponding to the N vectors. Consequently, in step S309, an image display unit 206 displays the N generated images to which blur was applied on the display device 109. This display UI will be described later.

In step S310, an image saving unit 207 makes a determination as to whether or not an image to be saved was selected on the displayed UI by a user, and which image was selected. In a case where there was an image that was selected to be saved, the image saving unit 207, in step S311, saves the selected image in the storage unit 104 and ends the processing. Meanwhile, in a case where the user did not perform selection of an image, this processing is ended. Details of image saving will be described later.

[Representative Vector Determination Unit]

Next, processing for determining a motion vector in the representative motion vector determination unit 204 will be described. The representative motion vector determination unit 204, for two or more primary subjects included in a scene, calculates the number of primary subjects and a representative motion vector which represents an average motion for each of these. Here, an example in which a representative motion vectors are calculated using a histogram and an example in which primary subjects are identified based on region division are described, but another method may be used.

Figure 4:
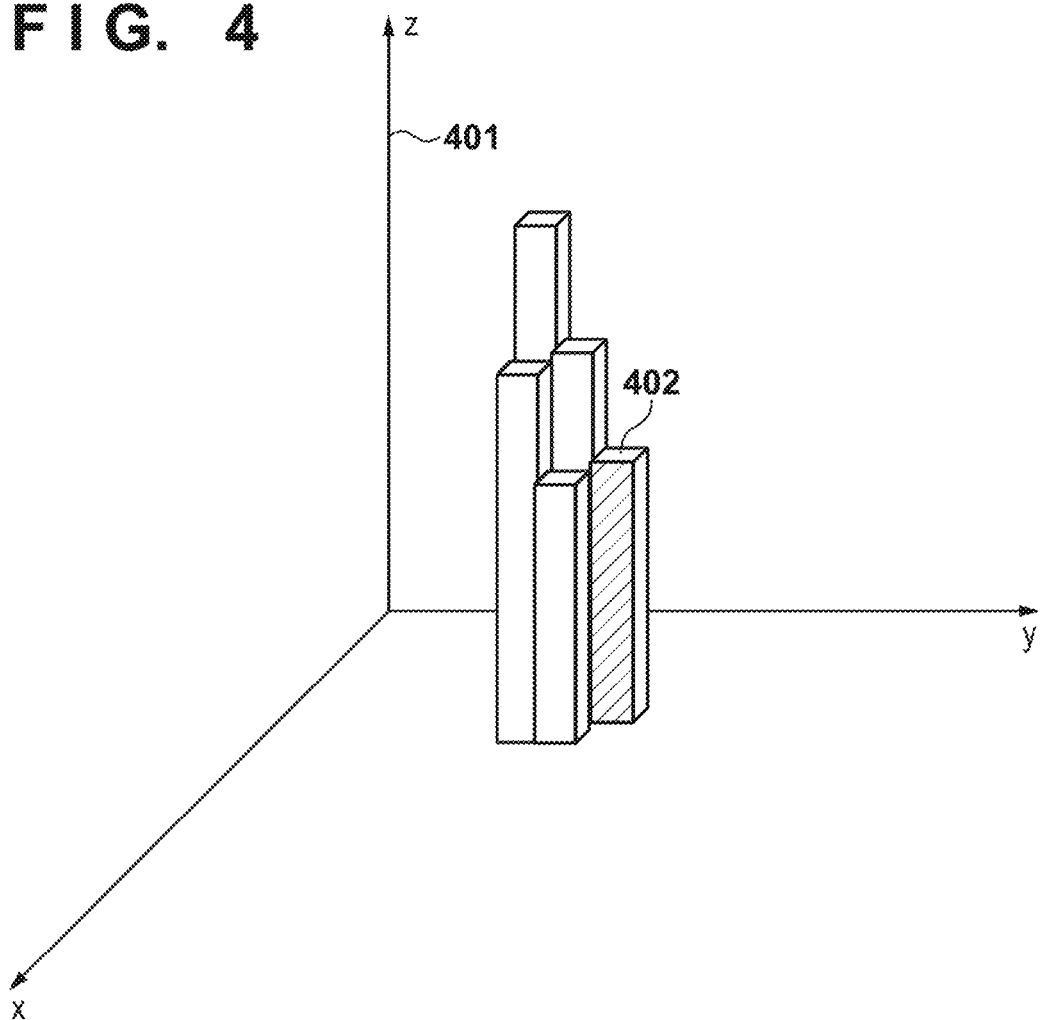
FIG. 4 is a view illustrating a histogram of motion vectors.

Firstly, an example that uses a histogram will be described using FIG. 4. FIG. 4 is something in which a reference image motion vector histogram is expressed. In a graph 401, the x and y axes correspond to an x component (horizontal component of the image) and a y component (vertical component of the image) of the motion vector. The axes are in units of pixels, and discretization is performed using a width $\Delta$. For example, 1 may be taken as the width $\Delta$. The length (value in the z axis) of a bar 402 expresses the number of motion vectors (appearance frequency) whose x component and y component respectively are in the ranges [$a\Delta$, $a\Delta+1$) and [$b\Delta$, $b\Delta+1$). a and b here are suitable integers. Note that "[", which represents a section, represents that the lower limit value of that section is included (greater than or equal to), and ")" represents that the upper limit value of that section is not included (less than).

The representative motion vector calculation unit 203 extracts N motion vectors in order from longest to shortest for the length (frequency) of the bar 402. At that time, ($a\Delta+0.5\Delta$, $b\Delta+0.5\Delta$), which is the barycentric position of [$a\Delta$, $a\Delta+1$), [$b\Delta$, $b\Delta+1$), is used for the motion vector value that is extracted. Above are details of the processing in a case where a histogram is used.

Note that in the above, the top N motion vectors by bar length are made to be the representative motion vectors, but it is possible to add to the condition that the frequency (value in the z axis) be greater than or equal to a threshold, and to determine N representative vectors at a maximum. In such a case, the number of representative motion vectors ends up depending on the images.

Next, a case in which a primary subject is identified based on region division will be described using FIG. 5.

Figure 5:
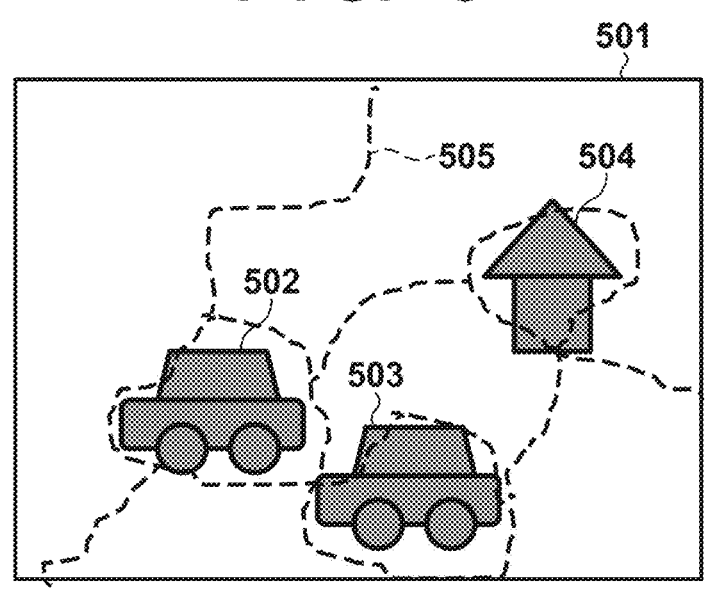
FIG. 5 is a conceptual diagram illustrating a result of a region division.

FIG. 5 is an example of an image that is divided in to regions by using a known region division method. Reference numerals 502 and 503 in the figure are moving subjects (cars) and reference numeral 504 is a stationary subject (house). Dashed lines 505 represent the boundary lines between divided ranges. The region division is assumed to use a known method such as a method of clustering based on pixel values. Alternatively, a suitable algorithm may be used for correction based on rough region dividing line information that the user inputted in advance. As described above, completely automatic processing may be used if it can perform the region division, and correction/precision improvement may be performed based on user inputted information.

The representative motion vector determination unit 204 performs the region division and calculates an average of the motion vectors in each region surrounded by dashed lines 505. If a motion vector representing region motion can be calculated, a value other than the average may be used. For example, a median value of the x and y components respectively may be employed. Also, in a case where the values of the motion vectors that represent the respective regions are close, regions may be integrated into a single region. Here, it is assumed that the distance between motion vectors measures a norm of a difference of the motion vectors.

Also, in a case where the motion information of a camera is considered in the determination processing of the representative motion vector determination unit 204, global motion may be calculated based on the motion information of the camera to identify a background region. The above is a description of a case in which region division is used.

[Blur Addition Unit]

Next, processing in the blur addition unit 205 is described. Here, a case where a plurality of images are aligned with a reference image and a case in which a blur filter is made to act on a reference image are described.

Figure 6:
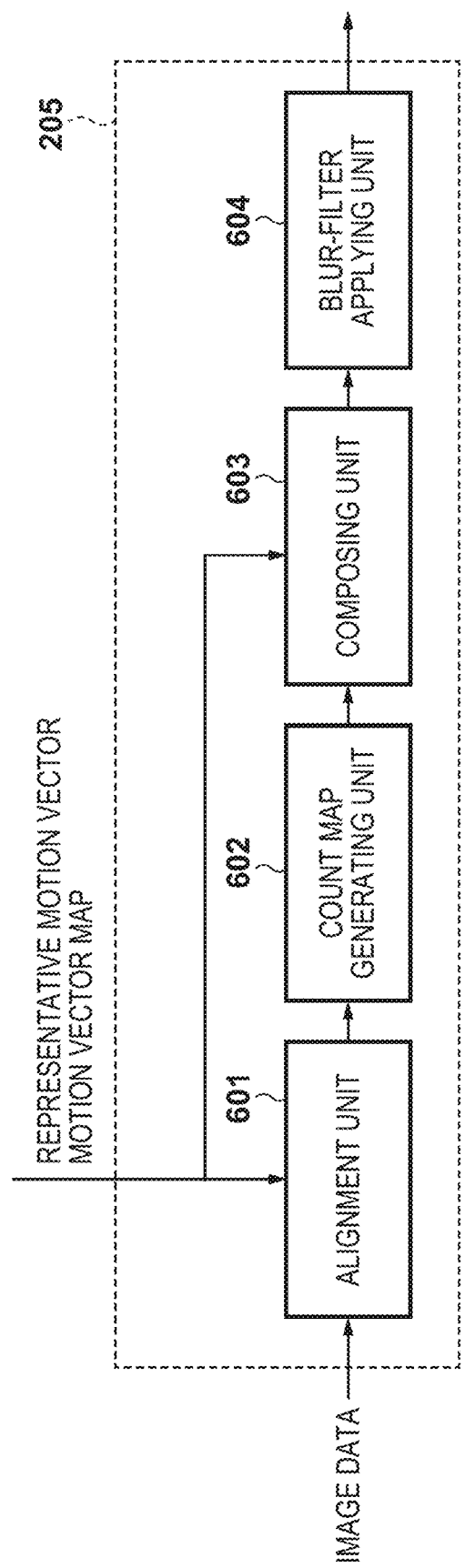
FIG. 6 is a block diagram illustrating a configuration of a blur addition unit.

For simplification of description, it is assumed that only motion vectors between a reference image and an image captured next to it are estimated, and motion vectors between a reference image and other images are obtained by multiplication by a constant as appropriate. For example, in a case where a frame number of a reference image is i, a motion vector between the frame numbers i and i+2, is obtained by doubling a motion vector between the frame numbers i and i+1. Of course, it goes without saying that all motion vectors may be calculated among the plurality of images. In particular, in a case where an acceleration motion is present, it is possible to obtain motion vectors whose accuracy is better by calculating all motion vectors. A configuration of the blur addition unit 205 is illustrated in FIG. 6, and description of operation thereof is given in accordance with the flowchart of FIG. 7. The blur addition unit 205, as in the figure, includes an alignment unit 601, a count map generating unit 602, a composing unit 603, and a blur-filter applying unit 604.

In step S701, the alignment unit 601 performs alignment of the plurality of images based on representative motion vector and motion vector map information. Conceptual diagrams for image alignment and image composition are described with reference to FIGS. 8A-8C. Also, below, a case in which two pieces of image data and three representative motion vectors are acquired is described.

Figure 8A:
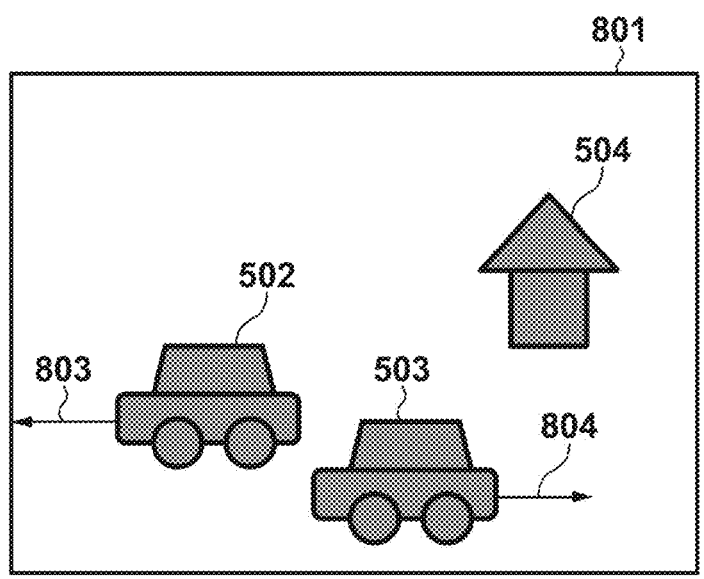
FIGS. 8A-8C are views for describing alignment composition.
Figure 8B:
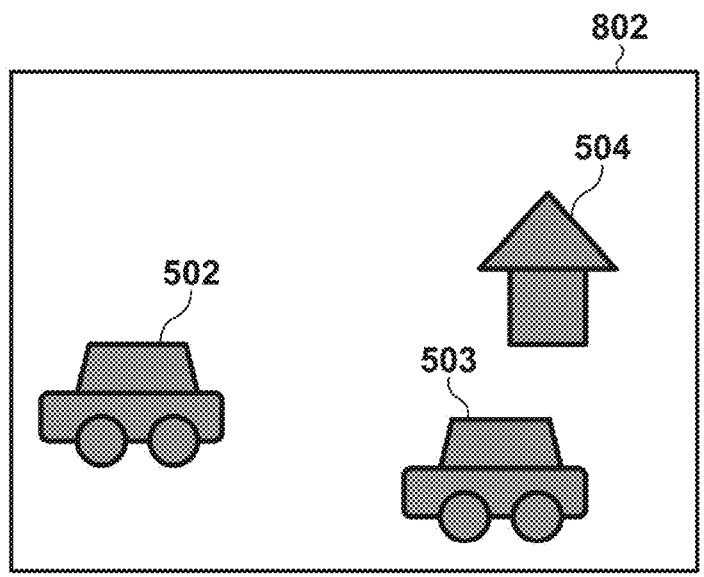

FIG. 8A illustrates a reference image 801. Also, FIG. 8B illustrates an image 802 of a frame that is adjacent on the time axis. Also, it is assumed that the images 801 and 802 of FIGS. 8A and 8B are images that a user obtained by capturing with the camera fixed.

Figure 8C:
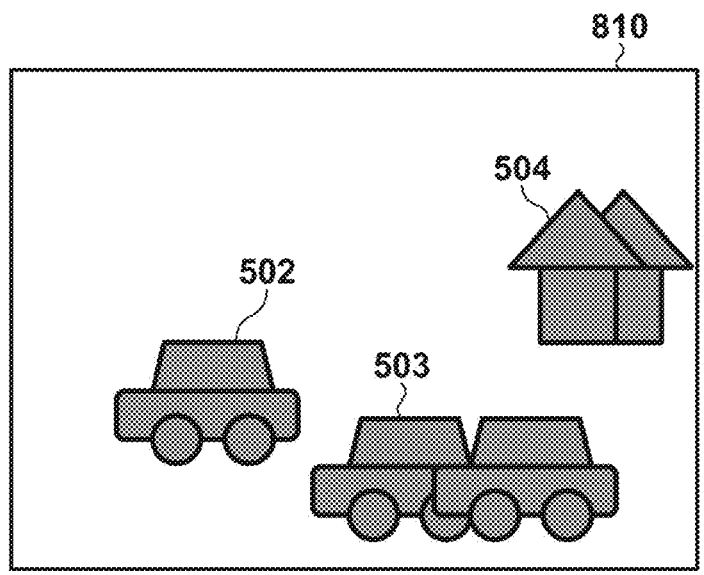

In the reference image 801, the vectors 803 and 804 represent representative motion vectors for a vehicle 502 and a vehicle 503 respectively. A house 504 is stationary. Therefore, while not shown graphically, a representative motion vector of "0" corresponding to the house 504 ends up being detected. In a case where alignment is performed with respect to the representative motion vector 803, a composite image is obtained by translating the image 802 by the length of the representative motion vector in a direction that is the reverse of the representative motion vector 803 and taking an arithmetic mean with the reference image 801. However, at the time of translation, it is assumed that the pixel value 0 is filled for portions in which there is no image information. Of course, the pixel value interpolation may be performed with another method. An image 810 illustrated in FIG. 8C is a composite image obtained by the composition processing. Note that the method for calculating pixel values of the composite image will be described later. In the image 810, it can be seen that the subject 502 is made stationary, and motion blur is applied to the subjects 503 and 504. Here, since motion of the subject is emphasized, an example where the motion amount is large is given, but actually, by making a capturing interval shorter and a number of captures larger, the motion blur becomes smoother than in FIGS. 8A to 8C. A blur filter may be caused to act in the direction of a motion vector to make the motion blur even smoother. Here, a case in which alignment is performed in relation to a representative vector 803 was described, but cases in which alignment is performed in relation to a representative vector 804, or a representative vector corresponding to the house 504 are similar.

Figure 9:
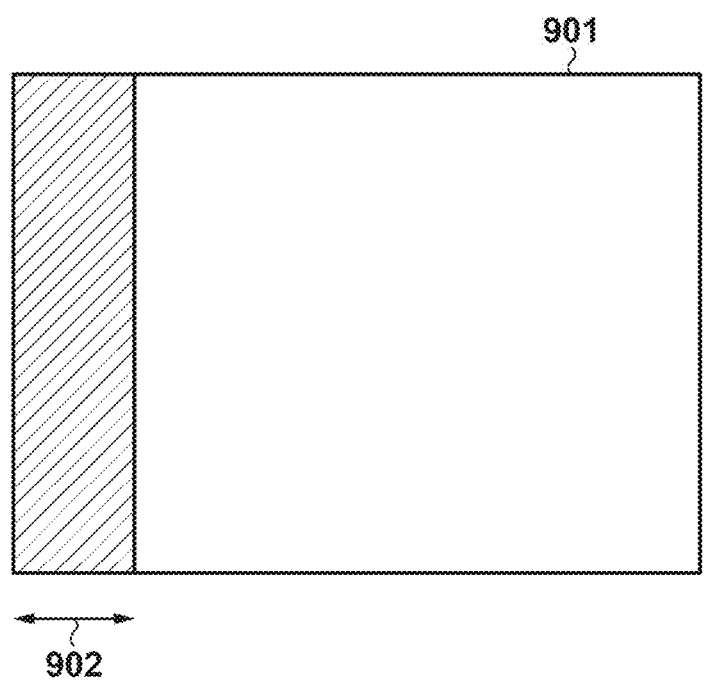
FIG. 9 is a conceptual diagram of a count map.

The description of the flowchart of FIG. 7 is returned to. In step S702, the count map generating unit 602 generates a count map. A conceptual diagram of the count map is illustrated in FIG. 9. In each pixel in the count map, the number of images used at the time of image composition is stored. An image 901 is something in which the numbers of the count map are made into an image, and indicates the result of a case in which two the images 801 and 802 are composed based on the representative motion vector 803. The count map 901 has the same number of pixels as the reference image 801. In the image 901, pixel values of the count map are standardized by the number of images, and white represents that the number of images=2, and gray that the number of images=1. Here, for convenience of description, an image is used, but it is not necessary to make an image, and numbers may be stored and held in a table. Since composition is performed after shifting the image 802 by the length of the representative motion vector 803 in the direction that is the reverse of the representative motion vector 803, a section 902 has the same length as the representative motion vector 803.

In a case where the count map generating unit 602, in step S703, determines that the number of the count map of a pixel of interest is a threshold or more, the composing unit 603, in step S704, performs image composition in relation to the pixel of interest. Here, the value of the pixel value $I_{synth}$(x, y) after image composition for the pixel of interest is calculated in accordance with the following equation (1).

$$I_{synth}(x, y) = \frac{1}{N(x, y)} \sum_i I'_i(x, y) \quad (1)$$

In Equation (1), (x, y) is the coordinate values of the pixel of interest, N(x, y) is the count map, and I'$_i$ (x, y) is an image into which the i-th image is translated based on the representative motion vector.

Meanwhile, assumed that in step S703, the count map generating unit 602 determined that the number of the count map of the pixel of interest is less than the threshold. In such a case, a smooth motion blur cannot be generated by image composition alone. Accordingly, in step S705, for the pixel whose count map is less than the threshold, the blur-filter applying unit 604 generates a blur filter based on a motion vector for the pixel of interest. For example, in a case where the subject is moving in a horizontal direction, the filter length is decided in accordance with the length of the motion vector, and a filter of [1, 1, 1, 1 . . . ] is generated. The filter is assumed to be normalized by filter coefficients. Also, several patterns of blur filters may be prepared in accordance with directions, and the filter may be determined in accordance with the direction of the motion vector. Also, the values of the filter coefficients may be changed in accordance with the distance from the pixel of interest. In step S706, the blur-filter applying unit 604 causes the blur filter to act on the pixel of interest. Here, for convenience of description, the blur filter is applied only in the case where the count map for the pixel of interest is less than or equal to a threshold, but to make the motion blur even smoother, the blur filter may be applied to each pixel in accordance with the motion vector.

[Image Display Unit]

Figure 10:
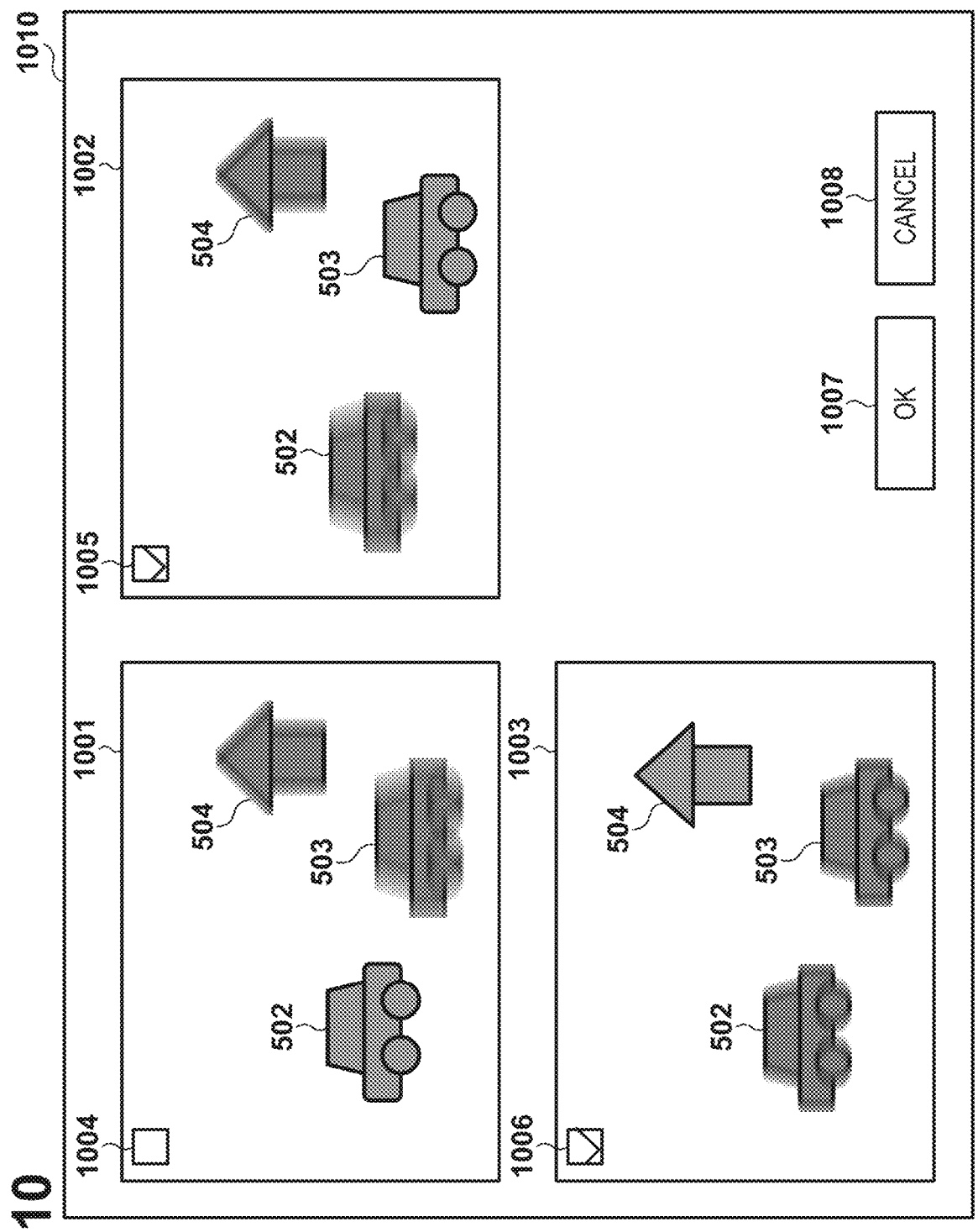
FIG. 10 is a view illustrating a UI of a display device according to the first embodiment.

The UI (user interface) that the image display unit 206 displays on the display device 109 is described using FIG. 10. In FIG. 10, the images 1001 to 1003 are images to which a motion blur is applied so as to make the subjects 502 to 504 respectively stationary. Note that, in the embodiment, since an example in which the number of representative motion vectors is three is described, three images to which a motion blur is applied are generated as in the figure.

By applying the motion blur, it is possible to present to the user images having a sense of speed that focus on the subjects 502 to 504 respectively. A check box is displayed to be superimposed on each image that is displayed so that the user can make a selection using a pointing device such as a mouse. In FIG. 10, the images 1002 and 1003 have been selected. A window 1010 is a UI screen that is displayed on the display device 109. Target images are determined by a user selecting one or more images that he or she likes among the check boxes 1004 to 1006 and pressing an OK button 1007, and the target images are saved in the storage unit 104 in step S311. In case where a plurality of images are selected by the check boxes, the plurality of images are saved in the storage unit 104. In the case of FIG. 10, the images 1002 and 1003 end up being saved in the storage unit 104. Here, only the images are saved, but a motion vector map may be saved in conjunction with a plurality of captured images. Also, in a case where a CANCEL button 1008 is pressed, the window 1010 is closed. Here, image selection is performed by using check boxes, but it goes without saying that if image selection is possible, another UI may be employed, such as one in which a user clicks images sequentially, and the surrounding color of the clicked image is changed or the like.

As described above, by presenting to the user a plurality of images to which a motion blur is applied, where the subject that is made stationary is changed, it becomes possible to easily obtain an image having a sense of speed in which a subject that the user which to focus on is made stationary.

Second Embodiment

Figure 11:
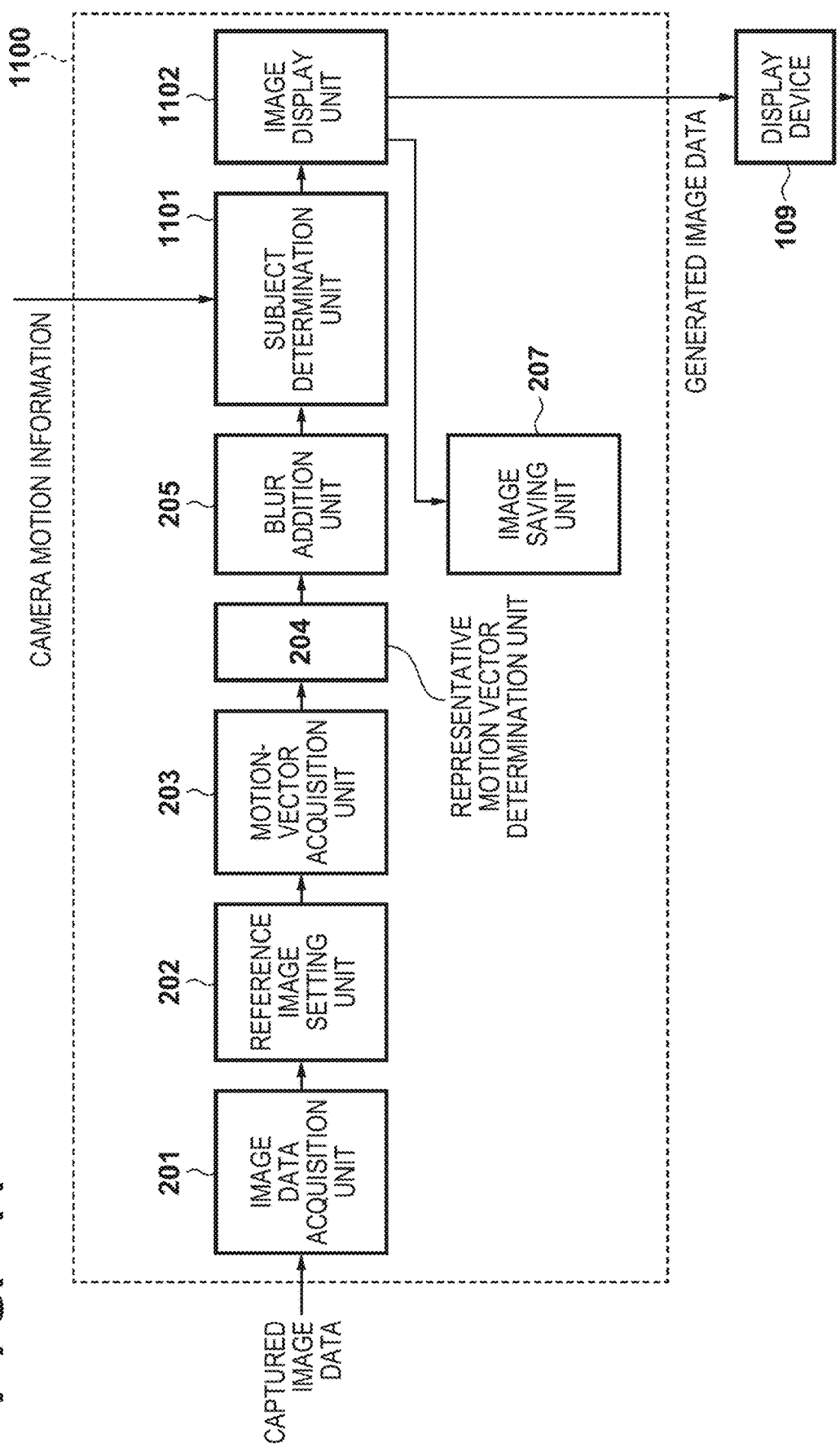
FIG. 11 is a block diagram illustrating a configuration of the image processing apparatus of a second embodiment.

In the first embodiment described above, a plurality of images in which different subjects are made stationary are displayed such that they can be selected by the user. In the second embodiment, a case in which additional information is displayed to the user at that time will be described. FIG. 11 is a view illustrating a configuration of an image processing apparatus 1100 of the second embodiment. In the figure, the reference numerals 201 through 205 and 207 are the same as in the first embodiment (FIG. 2), and so description thereof is omitted, and only differences from FIG. 2 are described.

Figure 12:
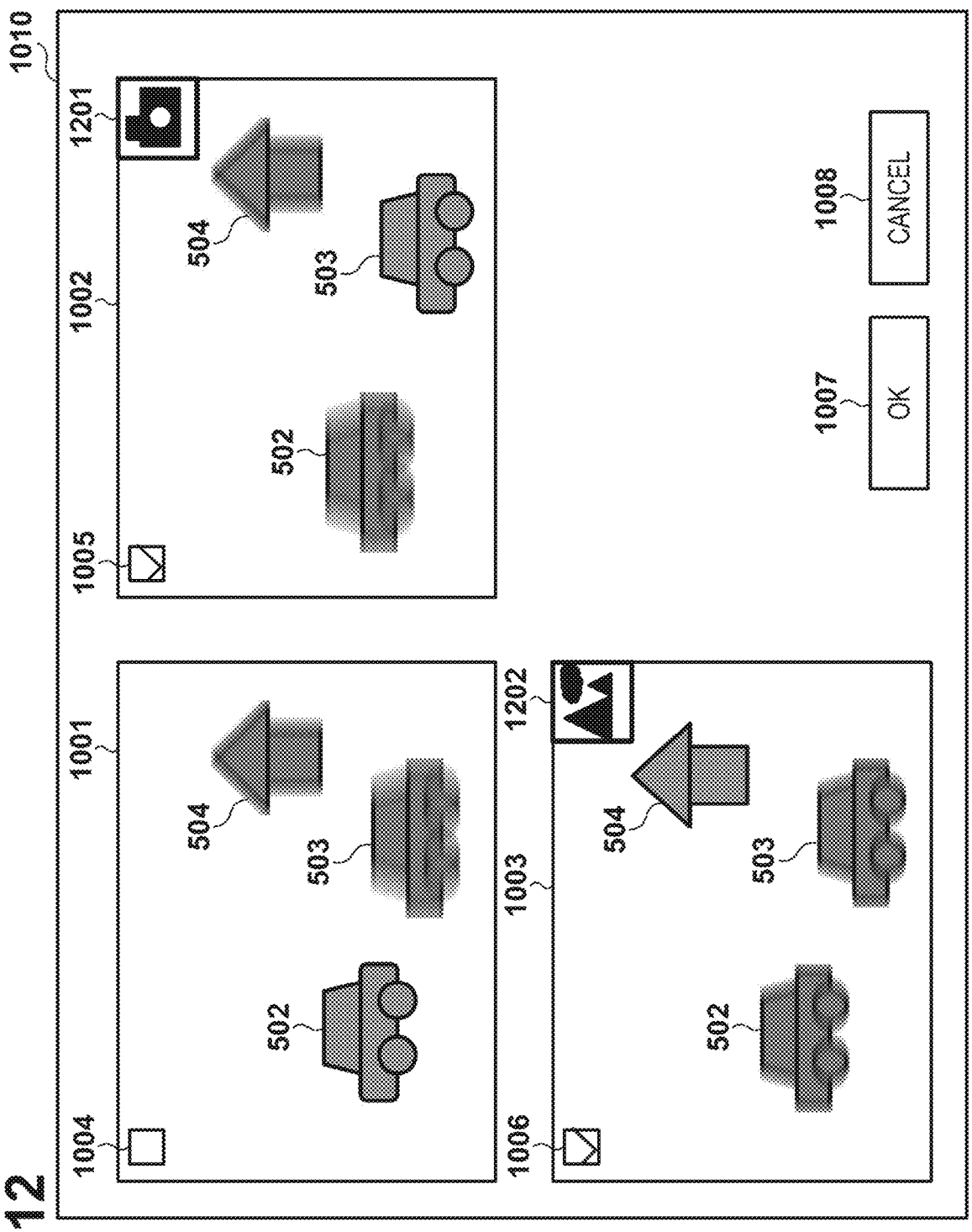
FIG. 12 is a view illustrating a UI of a display device according to the second embodiment.

A subject determination unit 1101 acquires camera motion information, and discriminates between a subject that the camera is following and a background subject (detailed description is given later). However, the acquired plurality of images and following of the camera are synchronized. The motion information of the camera may be acquired by an acceleration sensor or a gyro sensor that is mounted in the camera, and camera motion may be estimated based on image information captured by another camera. Also, the estimation may be performed using a depth sensor. An image display unit 1102 displays on the display device 109 determination information that the subject determination unit 1101 outputted in addition to an image to which the motion blur is applied. FIG. 12 illustrates a UI of the image display unit 1102 at a time of panning shooting. Only the differences from FIG. 10 will be described. In FIG. 12, an icon 1201 is an image to which a motion blur is applied wherein the motion of the camera is followed is expressed, and an icon 1202 is an image to which a motion blur is applied (an image in which a stationary subject is stationary) in a state in which the background (landscape) is stationary is expressed.

The subject determination unit 1101 extracts a representative motion vector whose norm is less than or equal to a threshold, and displayed the icon 1201 to be superimposed on a corresponding image on the UI screen. This uses the fact that when a panning shot is performed such that an identified subject is following by the camera (line of sight direction changes during consecutive capturing), the result of this is that the norm becomes smaller for the motion vector of the subject that the camera is following. As the norm threshold, it is possible to use two pixels or the like, for example. Note that configuration may also be taken such that this threshold can be set as appropriate by the user.

Also, the motion information of the camera is set such that the subject is at infinity, a conversion to global motion is performed on the image, and representative motion vectors for which the norm of the difference vector with the global motion is less than or equal to of the threshold are extracted, and the icon 1202 is displayed to be superimposed on corresponding images on the UI screen. This is because the landscape is treated as infinity and as a stationary subject.

When capturing while making the camera stationary in relation to the landscape, the subject that the camera is following is equal to the landscape in the image 1003, and so configuration may be taken to display only the icon 1202, and configuration may be taken to display the icons 1201 and 1202 to be lined up.

As described above, by information by which it is possible to distinguish whether a subject is a stationary subject (the background) or a moving subject (a car in the embodiment) being displayed to be superimposed on the UI, reference information for when the user selects an image can be provided.

Third Embodiment

In the first embodiment, image candidates for each subject that is made stationary are displayed to the user, but in the present embodiment, an example in which the user can make fine correction when there is an error in alignment based on motion vectors is described.

Figure 13:
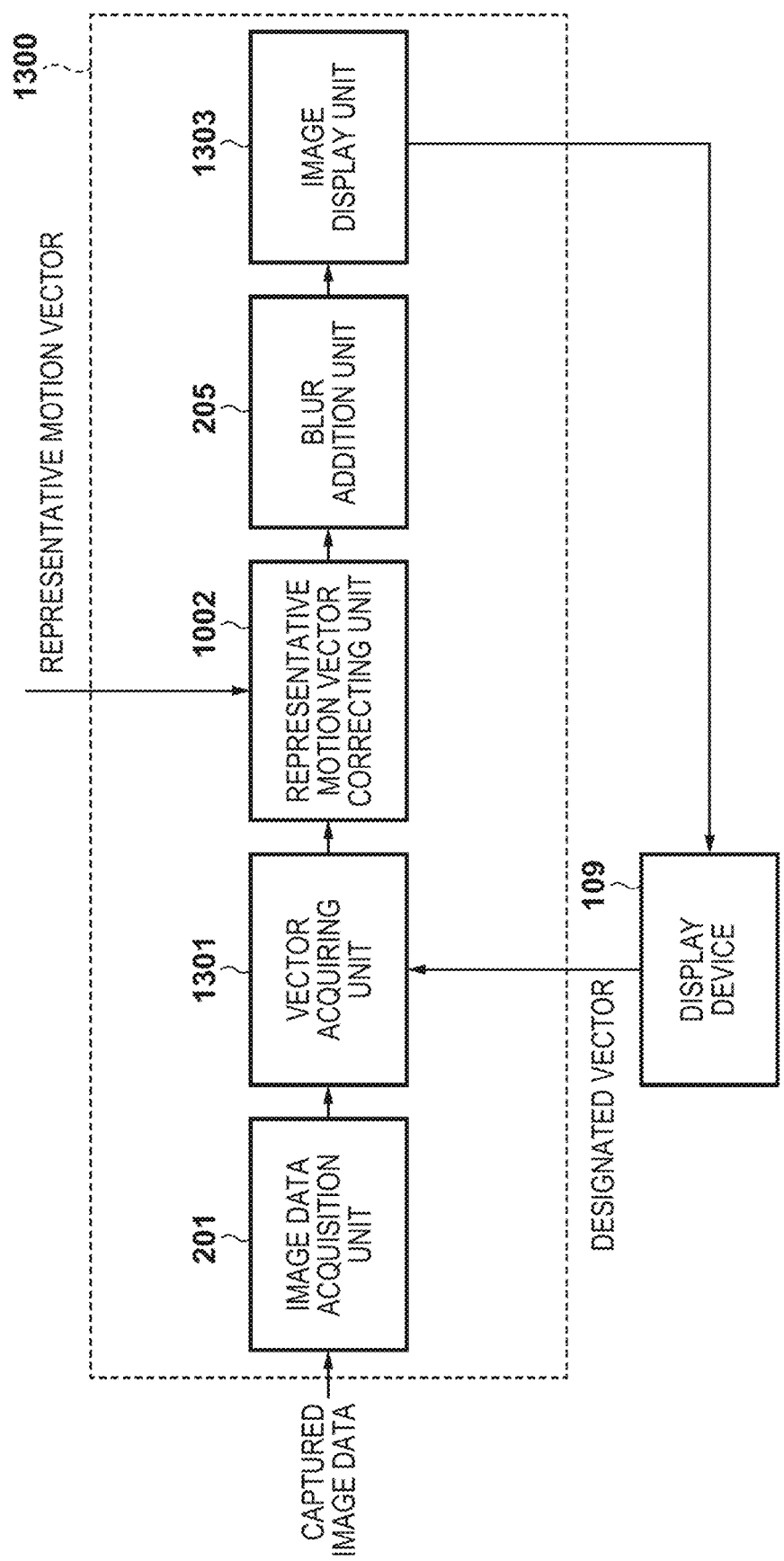
FIG. 13 is a block diagram illustrating a configuration of the image processing apparatus of a third embodiment.

FIG. 13 is a view illustrating a configuration of an image processing apparatus 1300 of the third embodiment. Here, only differences with FIG. 2 are described. A vector acquiring unit 1301 acquires a vector value that a user inputted by the display device 109. Note that the display device 109 in the third embodiment is assumed to have a touch panel, but inputting of the vector value may be by a pointing device such as a mouse or a keyboard.

A representative motion vector correcting unit 1302 acquires a representative motion vector, and corrects a value of the representative motion vector based on a vector value that the vector acquiring unit 1301 acquired (detailed description is given later). An image display unit 1303 displays a result on the display device 109. UIs of the image display unit 1303 is described using FIG. 14 and FIG. 15.

Figure 14:
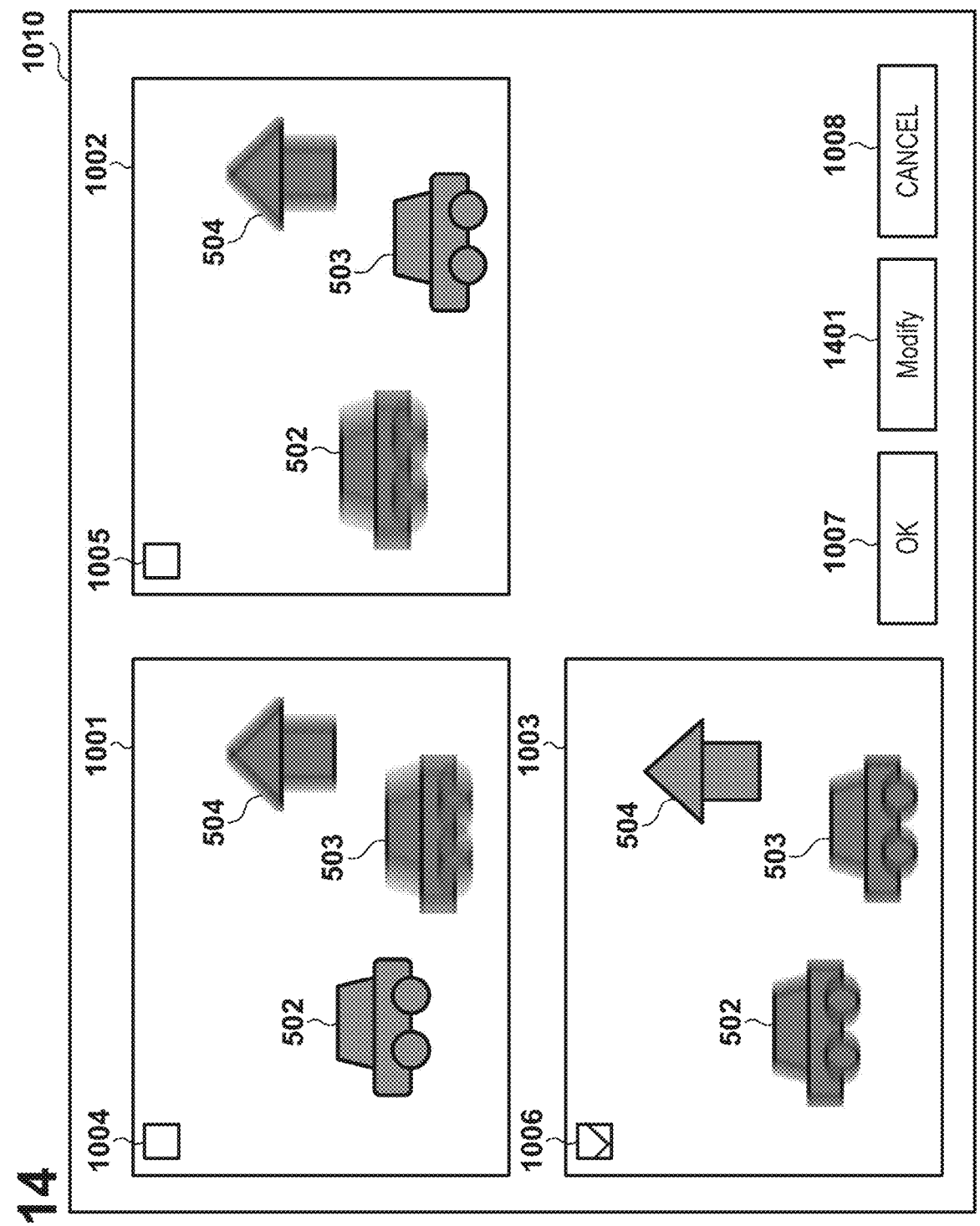
FIG. 14 is a view illustrating a UI of a display device according to the third embodiment.
Figure 15:
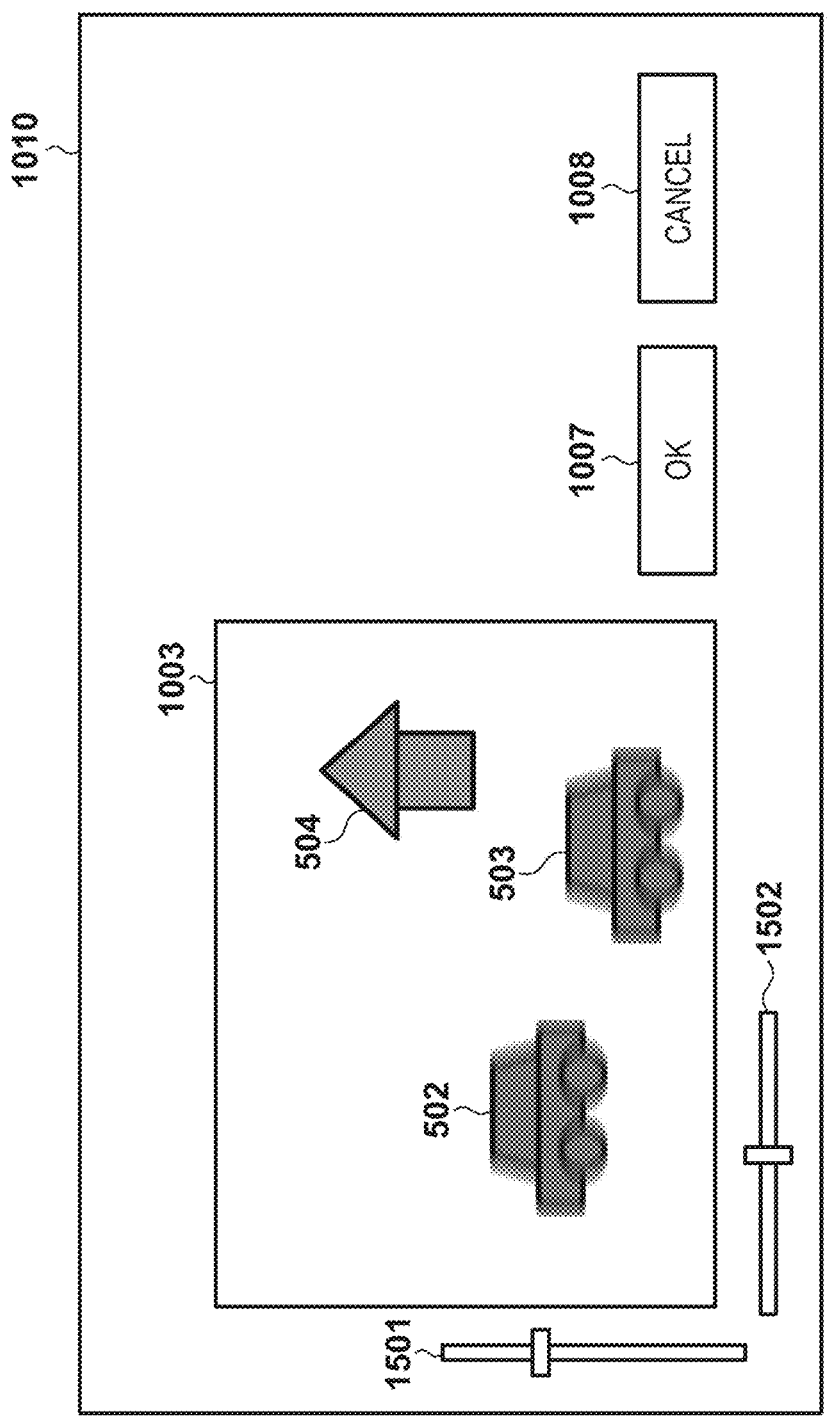
FIG. 15 is a view illustrating a UI of a display device according to the third embodiment.

FIG. 14 is a display screen corresponding to FIG. 10 in the first embodiment. As in the figure, a Modify button 1401 for instructing a correction is additionally displayed. When the user presses the Modify button 1401 in a state in which the user has selected one of the displayed images (the image 1003 is selected in the figure), the UI screen illustrated in FIG. 15 is transitioned to. In FIG. 15, slide bars 1501 and 1502 correspond to values in the x direction and y direction of the vector value. By the user adjusting the slide bars 1501 and 1502 respectively, a correction value corresponding to the representative motion vector used when generating the selected image is supplied to the vector acquiring unit 1301 through a display unit 109. Here, a vector value is inputted by using the slide bars, but another UI may be used, such as inputting the vector values for the x direction and the y direction by text boxes.

The representative motion vector correcting unit 1302 corrects (updates) the values of a representative motion vector in accordance with the following equation (2) based on vector values ($u_x$, $u_y$) that the user inputted in relation to the representative motion vector ($v_x$, $v_y$).

$$(v_x, v_y) \leftarrow (v_x, v_y) + (u_x, u_y) \quad (2)$$

By the above, in a case where there is an error in alignment, it is possible to obtain a high quality motion blur image that is in conformity with the taste of the user by the user performing fine adjustment.

An embodiment according to the present invention is described above. Because the image processing apparatus described in the embodiment is something that generates an image to which motion blur is applied from images captured consecutively, it may be implemented in an image apparatus such as a digital camera. In such a case, even if the user is unfamiliar with a panning shot, for example, an image list that is the result of processing of FIG. 10 is obtained simply by performing continuous shooting with the function of the above-described embodiment turned ON, and targets for saving can be selected as user favorites.

Fourth Embodiment

In the first and second embodiments, a UI screen is displayed on the display device 109, and an image that the user selects/corrects is saved in the storage unit 104.

In the present embodiment, description is given of a case in which an image is saved in the storage unit 104 directly without display on a UI. In such a case, the processing of step S309 and step S310 in FIG. 3 is not performed, and step S311 is transitioned to after the end condition is satisfied in step S307. At that time, the image saving unit 207 may save all the images displayed on the UI in the first and second embodiments, and configuration may be taken such that the tastes of users are accumulated in a database in advance and something that is closest to the user's taste is saved. For example, in FIG. 12, if the frequency at which the user selects the images in which the icons 1201 and 1202 are displayed is high, configuration may be taken to save only the images in which the icons 1201 and 1202 are displayed.

As described above, by virtue of the present embodiment, it becomes possible to reduce user operation burden because the image is saved automatically.

Fifth Embodiment

In the first through fourth embodiments, description is given of a UI in which a plurality of still images are displayed, but in the present embodiment, description is given for a case in which, based on images captured consecutively, a plurality of moving images are generated, displayed on a UI, and saved. In the present embodiment, description is given of a case in which continuous capturing is performed with a high shutter speed, but a case of moving image capturing at 60 fps or the like is similar. In the figure, description is given only of differences from the first to fourth embodiments.

Figure 16:
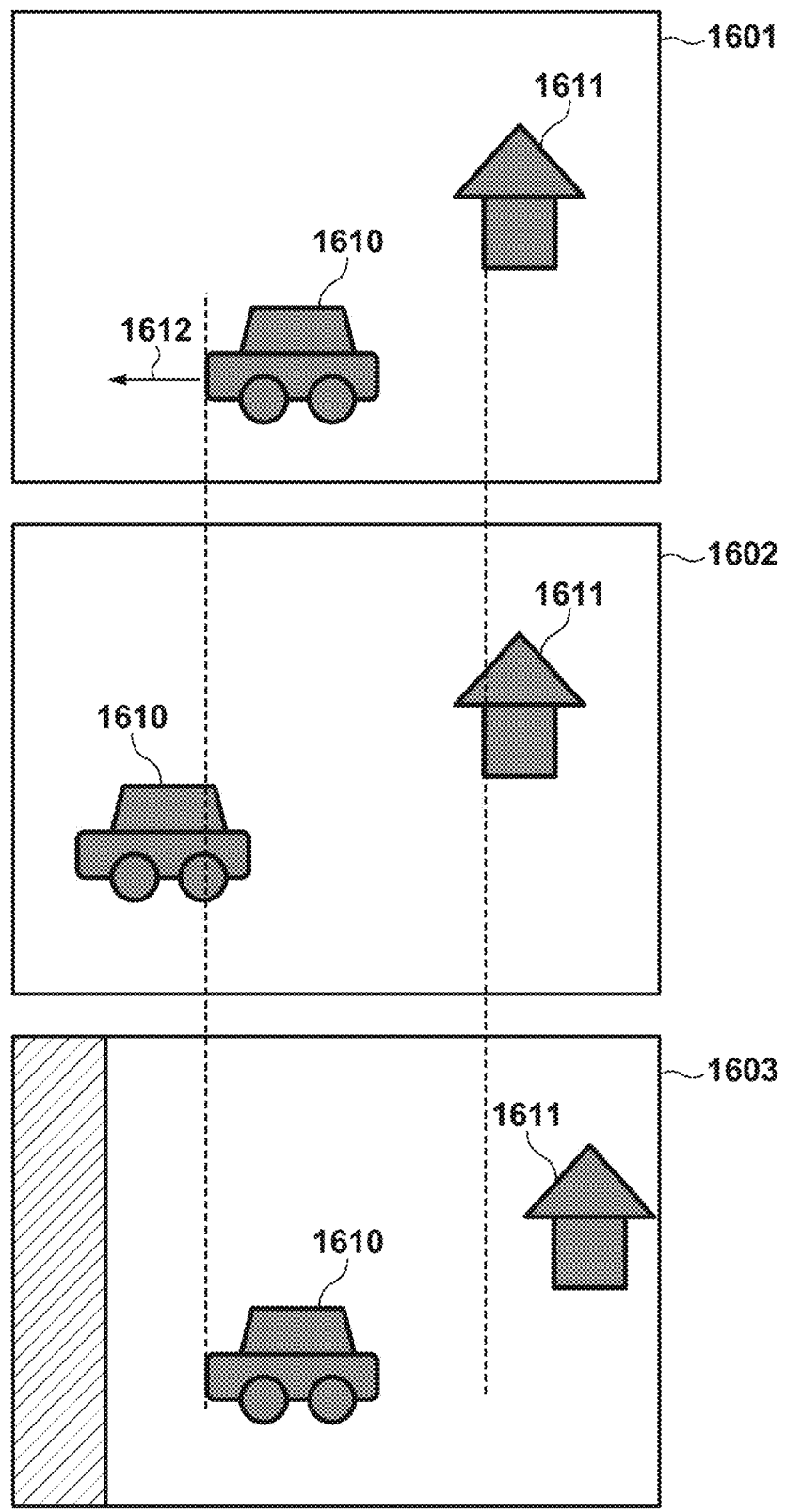
FIG. 16 is a view for describing alignment composition according to a fifth embodiment.

FIG. 16 is a conceptual diagram for when new consecutive images are generated from captured consecutive images. In FIG. 16, an image 1601 is an Nth frame, an image 1602 is an N+1th frame, and the Nth frame is made to be a reference frame. In a case where alignment is performed with respect to a representative motion vector 1612, a new N+1th composite frame 1603 is obtained by translating the image 1602 by the length of the representative motion vector in a direction that is the reverse of the representative motion vector 1612. At that time, because there is no information on the image 1602 for the portion indicated by diagonal lines, it is assumed that pixel values of the image 1601 are substituted there. Of course, information of other frames may be used. Next, alignment is performed between the frame 1603 and an N+2th frame and the new N+2th frame image is obtained. The foregoing processing can also be applied similarly for frames prior to the N frames. By repeating this processing, it is possible to generate a moving image that appears as though it were captured so as to follow a vehicle 1610. Of course, alignment may be performed skipping a few frames rather than performing alignment in sequence for every frame.

As described above, moving images for which alignment is performed with respect to each representative motion vector are displayed on the window 1010. The manner of display is similar to in the first and second embodiments, but it is assumed that moving images are displayed for the reference numerals 1001 to 1003. For example, in the reference numeral 1001, a moving image in which the vehicle 502 is stationary and the vehicle 503 and the house 504 are moving is displayed. This corresponds to a moving image captured by following the vehicle 502. Meanwhile, in the reference numeral 1003, a moving image in which the house 504 is stationary and the vehicles 502 and 503 are moving is displayed. This corresponds to a moving image captured by the videographer being stationary. Note that, a blur filter for 1/60 sec is applied based on motion vectors in order to display smoothly when displaying something that is continuous-captured with a high-speed shutter as a moving image at 60 fps, for example.

As described above, by virtue of the present embodiment, by presenting to a user a plurality of moving images for which the subject that is made stationary is different, it becomes possible to easily obtain a moving image for which a subject that a user wishes to focus on is made stationary.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-056457 filed Mar. 22, 2017 and No. 2017-250109 filed Dec. 26, 2017, which are hereby incorporated by reference herein in their entirety.

What is claimed is:

1. An image processing apparatus that generates a composite image from a plurality of images, the apparatus comprising:
one or more processors; and
one or more memories storing instructions to be executed by the one or more processors, wherein the instructions causes the one or more processors to function as units including:
an acquiring unit configured to acquire a plurality of pieces of image data captured consecutively;
an identifying unit configured to identify a subject in the image data;
a generating unit configured to generate a first composite image in which at least two pieces of image data, among the plurality of pieces of image data, are composed in accordance with a motion of a first subject, and a second composite image in which at least two pieces of image data, among the plurality of pieces of image data, are composed in accordance with a motion of a second subject whose motion is different to the motion of the first subject; and
a display unit configured to display the first composite image separate from the second composite image.

2. The apparatus according to claim 1, further comprising an extracting unit configured to make one of the plurality of pieces of image data reference image data, and extract motion vectors of a plurality of subjects included in the reference image data between the reference image data and other image data,
wherein the generating unit generates composite image data by, based on a motion vector of interest among the motion vectors, composing the reference image data and other image data such that a subject of interest is at the same position.

3. The apparatus according to claim 2, wherein the generating unit, based on a motion vector of interest among the motion vectors extracted by the extracting unit, generates a plurality of pieces of composite image data by performing, for the number of extracted motion vectors, generation of composite image data by composing the reference image data and other image data so that a subject of interest is at the same position.

4. The apparatus according to claim 2, wherein the extracting unit obtains a motion vector appearance frequency, and determines a number of top appearance frequency motion vectors, the number being set in advance, as extraction targets.

5. The apparatus according to claim 2, wherein the generating unit generates the composite image data by shifting the other image data in a direction opposite to that of the motion vector of interest, and composing with the reference image data.

6. The apparatus according to claim 2, wherein a histogram of motion vectors for each pixel in the reference image is generated, and by extracting N motion vectors in order of from highest to lowest motion vector frequency, motion vectors for a plurality of subjects included in the reference image are extracted.

7. The apparatus according to claim 2, wherein the reference image is divided into a plurality of regions, and by calculating an average of motion vectors in each region, motion vectors for a plurality of subjects included in the reference image are extracted.

8. The apparatus according to claim 1, further comprising a save unit configured to, prior to displaying the plurality composite images obtained by the generating unit, automatically save at least one of the plurality of composite images.

9. The apparatus according to claim 1, further comprising a display unit configured to display, as moving images, the first composite image and the second composite image obtained by the generating unit lined up.

10. The apparatus according to claim 1, wherein the generating unit, when composing pieces of image data, composes by using a blur filter based on a motion vector.

11. The apparatus according to claim 1, wherein the acquiring unit further acquires information representing a motion of an image apparatus for when capturing the plurality of pieces of image data,
wherein the display unit displays the plurality of composite images so it can be distinguished whether a primary subject is a stationary subject or a moving subject in each piece of composite image data from motion information of the image apparatus and the motion vectors.

12. The apparatus according to claim 1, wherein the display unit displays the plurality of composite images so as to be selectable by a user.

13. The apparatus according to claim 12, further comprising a correcting unit configured to correct, in accordance with an instruction by a user, a motion vector used when generating a composite image that a user selected.

14. The apparatus according to claim 1, further comprising a display unit configured to display an icon, indicating that a composition in accordance with a motion of a subject in the plurality of images was performed, to be superimposed in the first composite image and the second composite image.

15. The apparatus according to claim 1, further comprising a display unit configured to display information, by which it is possible to discriminate whether a subject is a stationary subject or a moving subject, to be superimposed on a UI for the first composite image and the second composite image.

16. The apparatus according to claim 1, further comprising a display unit configured to, when a correction instruction by a user corresponding to at least one of the composite images is received, display a slide bar for correcting the motion vector,
wherein the correcting unit corrects the motion vector in accordance with input by a user on the slide bar.

17. A method of controlling an image processing apparatus that generates a composite image from a plurality of images, the method comprising:
acquiring a plurality of pieces of image data captured consecutively;
identifying a subject in the image data;
generating a first composite image in which at least two pieces of image data, among the plurality of pieces of image data, are composed in accordance with a motion of a first subject, and a second composite image in which at least two pieces of image data, among the plurality of pieces of image data, are composed in accordance with a motion of a second subject whose motion is different to the motion of the first subject; and
displaying the first composite image separate from the second composite image.

18. The method according to claim 17, further comprising: displaying, lined up, the first composite image and the second composite image obtained by the generating.

19. A non-transitory computer-readable storage medium storing a program which, when read and executed by a computer, causes the computer to perform steps of a method of controlling an image processing apparatus that generates a composite image from a plurality of images, the method comprising:
acquiring a plurality of pieces of image data captured consecutively;
identifying a subject in the image data;
generating a first composite image in which at least two pieces of image data, among the plurality of pieces of image data, are composed in accordance with a motion of a first subject, and a second composite image in which at least two pieces of image data, among the plurality of pieces of image data, are composed in accordance with a motion of a second subject whose motion is different to the motion of the first subject; and
displaying the first composite image separate from the second composite image.

* * * * *